United States Patent [19]

Miki et al.

[11] Patent Number: 5,060,056
[45] Date of Patent: Oct. 22, 1991

[54] LUMINANCE SIGNAL/COLOR SIGNAL SEPARATING CIRCUIT AND NOISE REDUCTION CIRCUIT USING A COMB FILTER

[75] Inventors: Shigeru Miki; Mitsuzou Shirai, both of Osaka; Yuuichi Ichikawa, Gunma, all of Japan

[73] Assignee: Sanyo Electric Co., Ltd., Moriguchi, Japan

[21] Appl. No.: 521,489

[22] Filed: May 10, 1990

[30] Foreign Application Priority Data

Jun. 2, 1989 [JP] Japan ................................. 1-141373

[51] Int. Cl.⁵ .............................................. H04N 9/64
[52] U.S. Cl. ........................................ 358/31; 358/36
[58] Field of Search .................... 358/31, 36, 37, 314, 358/329

[56] References Cited

U.S. PATENT DOCUMENTS 3,764,739 10/1973 Faroudja .
4,186,411 1/1980 Numakura ............................ 358/329
4,858,004 8/1989 Kitagaki et al. .................. 358/21 R

FOREIGN PATENT DOCUMENTS 59-107691 6/1984 Japan .

Primary Examiner—Victor R. Kostak
Assistant Examiner—Kim Yen Vu
Attorney, Agent, or Firm—Armstrong, Nikaido, Marmelstein, Kubovcik & Murray

[57] ABSTRACT

A luminance signal/color signal separating circuit comprises a comb filter for Y/C separation. The addition output of the comb filter comprises a luminance signal component, while the subtraction output comprises a color signal component and non-correlation components of a luminance signal. The non-correlation components in the subtraction output are extracted by a trap circuit and added to the addition output of the comb filter. Accordingly, the degradation of vertical direction resolution of reproduced signal will be prevented. Also, under some circumstances, the extracted non-correlation components are previously enhanced before being added to the luminance signal. The noise reduction circuit in reproduction mode shares the above comb filter for color signal separation. When dropout occurs, the color signal in the output of the 1H delay circuit of the comb filter is inverted and separated to be used as a drop out compensation signal.

10 Claims, 7 Drawing Sheets

LUMINANCE SIGNAL/COLOR SIGNAL SEPARATING CIRCUIT AND NOISE REDUCTION CIRCUIT USING A COMB FILTER

BACKGROUND OF THE INVENTION

1. Field of the Invention

This invention relates to luminance signal/color signal separating circuits and noise reduction circuits, and more particularly, to luminance signal/color signal separating circuits and noise reduction circuits using comb filters in magnetic recording reproducing devices such as video cassette recorders (hereinafter referred to as VCR).

2. Description of the Background Art

A VCR has been proposed using a 1H delay (DL) circuit comprising one CCD (Charge Coupled Device), operating as a comb filter during recording for separating an input video signal into a luminance signal (Y) and a color signal (C) (Y/C separation), and operating as a noise reduction circuit during reproduction for removing the crosstalk components in the reproduced color signal as well as removing the small noise components in the reproduced luminance signal, such as the one disclosed in Japanese Patent Laying-Open No. 59-107691 for example.

Y/C separation by a comb filter using a 1H delay circuit is well known, as disclosed in U.S. Pat. No. 3,764,739. A color TV signal (hereinafter referred to as video signal) of the NTSC system has the spectrum of luminance signal components and the spectrum of color signal components alternately interleaved as shown schematically in the frequency spectrum diagram of FIG. 1 to avoid beat disturbance on the screen. Generally, when there is no difference between adjacent upper and lower horizontal lines, that is, when there is line correlation, luminance signal components are concentrated in the vicinity of the spectrum of n times (n is integer) the horizontal frequency $f_H$ (solid lines $Y_1$), while color signal components are concentrated in the vicinity of the spectrum of $(n+\frac{1}{2}) f_H$ (broken lines C). That is, Y signal components and C signal components are mutually frequency interleaved by $(\frac{1}{2}) f_H$. On the contrary, when there is difference between adjacent upper and lower horizontal lines, that is, when there is no line correlation, non-correlation components $Y_2$ and $Y_3$ of the Y signal are generated respectively in the low frequency region and the high frequency region of the complete band of signal Y in a frequency interleaved relation with the frequency multiplied output $Y_1$ of the horizontal frequency (FIG. 1).

Figure 1:
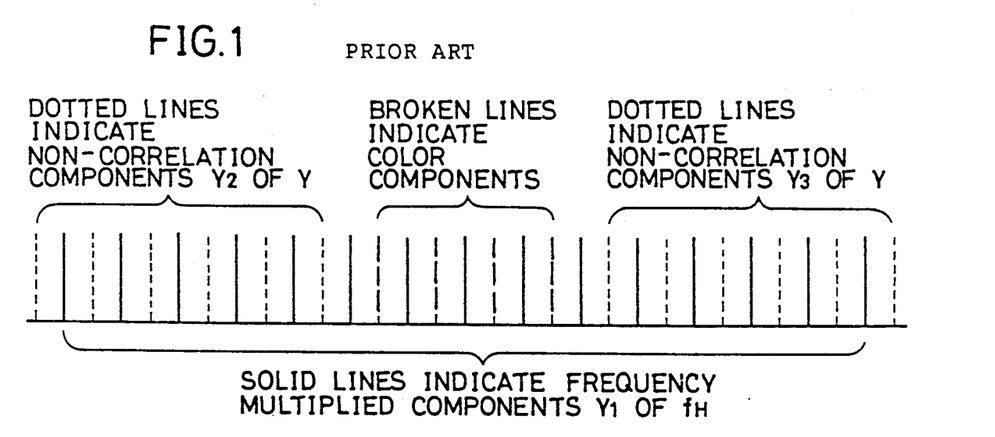
FIG. 1 is a schematic diagram showing the spectrum of luminance signal component and color signal component.

For example, in a VCR recording mode, a filter having a comb type band-pass characteristic periodically repeated in accordance with the repetition of the spectrum shown in FIG. 1 is required to separately extract luminance signal components and color signal components from the input video signal having such a frequency spectrum.

Figure 2:
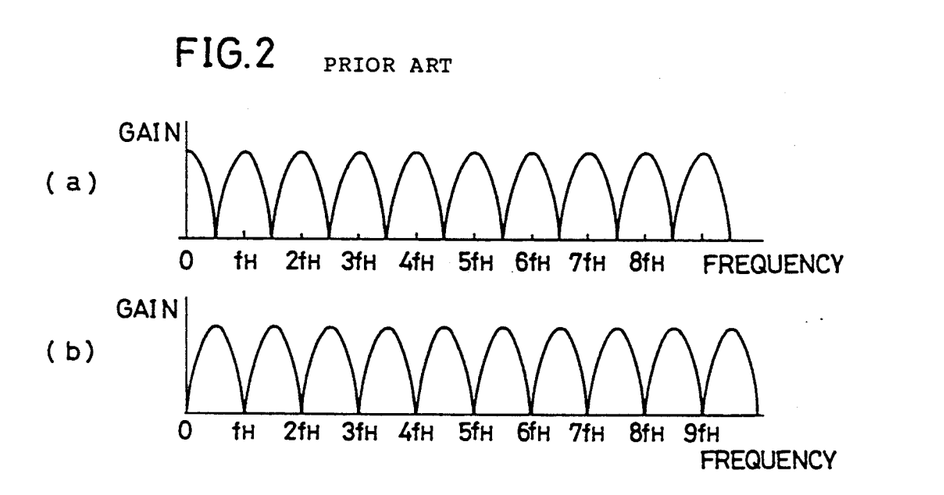
FIG. 2 is a diagram showing the pass band characteristic of a comb filter.
Figure 3:
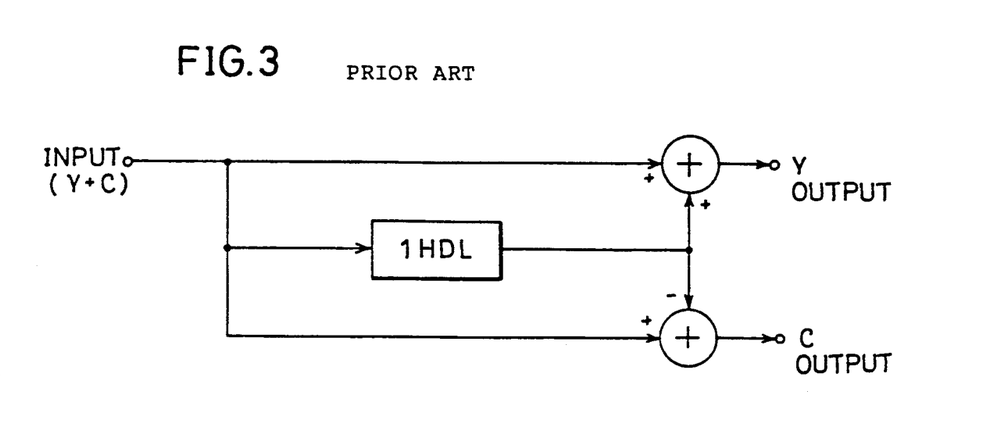
FIG. 3 is a schematic block diagram showing the basic configuration of a comb filter.

A filter having such a comb band-pass characteristic is implemented by adding or subtracting an input video signal (Y+C) and a signal delayed by 1H by employing a 1H delay circuit, by means of a circuit shown in FIG. 3 for example. In the event of the above two signals being added, a passing characteristic with the peak at $nf_H$ and the valley at $(n+\frac{1}{2}) f_H$ is realized as shown in FIG. 2(a) to pass the luminance signal components $Y_1$. On the other hand, in the event of the above two signals being subtracted, a passing characteristic with the valley at $nf_H$ and the peak at $(n+\frac{1}{2}) f_H$ is realized as shown in FIG. 2 (b) to pass the color signal components C.

During a recording mode of a VCR, a Y/C separating circuit using the above mentioned comb filter will extract luminance signal components in accordance with the comb type band-pass characteristic shown in the above FIG. 2 (a) with respect to the complete band of the luminance signal. Therefore, the non-correlation components $Y_2$ and $Y_3$ in the low and high frequency regions of Y in $(\frac{1}{2}) f_H$ frequency interleaved relation with respect to $Y_1$ which is the frequency multiplied output of the horizontal period $f_H$ are not extracted in the low and high frequency regions of the above mentioned complete band and will be excluded from the luminance signal components. This eliminates the luminance signal variation between the upper and lower lines, that is, in the vertical direction, resulting in a problem of degradation in vertical resolution of the picture on the screen.

A 1H delay circuit used as a Y/C separating filter in a recording mode will be used as a noise reduction circuit during a VCR reproduction mode for removing the mixture of low frequency converted color signal components from adjacent tracks on a tape, that is, crosstalk, in the reproduction system of the color signal. In addition, this 1H delay circuit will be used as a noise reduction circuit for removing small noise components in a luminance signal in the reproduction system of the luminance signal. However, since such a noise reduction circuit will suppress not only the noise components in the luminance signal, but also the small signal components as noise, there was a problem that the small signal components will be decreased in the reproduced luminance signal.

Furthermore, generally in the reproduction mode, it is regarded that conventional VCRs will compensate for the missing reproduction signal, that is, will perform dropout compensation using the 1H delayed signal of the adjacent horizontal period reproduced signal when the reproduced signal is missing, i.e., when dropout occurs in a horizontal period. However, the output of the 1H delay circuit constituting the above mentioned comb filter has the phase of the color subcarrier 180° shifted with respect to the missing reproduced signal to be compensated. Therefore, the output of the 1H delay circuit may not be used for dropout compensation as it is.

SUMMARY OF THE INVENTION

Accordingly, an object of the present invention is to prevent the degradation in vertical resolution of the VCR's reproduced image.

Another object of the invention is to prevent the decrease of small signal components in VCR's reproduced luminance signals.

Yet another object of the present invention is to perform satisfying dropout compensation even when dropout occurs in VCR's reproduced signals.

Still another object of the invention is to provide a luminance signal/color signal separating circuit that may separate luminance signal components without removing non-correlation components.

Still a further object of the invention is to provide a noise reduction circuit that does not remove small signal components in a luminance signal as noise.

A still further object of the invention is to provide a noise reduction circuit for performing dropout compensation using a 1H delay circuit output of a comb filter.

In summary, the present invention is configured so as to extract the non-correlation components of a luminance signal from the output of a subtraction circuit of a comb filter to be added to a luminance signal component provided from an addition circuit of the comb filter in a luminance signal/color signal separating circuit using the comb filter.

In accordance with another aspect of the present invention, a luminance signal/color signal separating circuit is configured so as to previously enhance the small signal components which will be suppressed by a noise reduction circuit during reproduction to be added to the luminance signal component.

In accordance with another aspect of the invention, a noise reduction circuit is configured so as to compensate for dropout using the 1H delayed reproduced luminance and color signals by inverting the subcarrier phase of a color signal of 1H before when dropout occurs in the reproduced signal.

Therefore, the main advantage of the present invention resides in preventing the degration of vertical resolution by adding non-correlation components to the luminance signal component extracted by a comb filter to compensate for luminance signal variation between horizontal lines.

Another advantage of the present invention resides in that the small signal components in luminance signal will not be suppressed as noise during reproduction, due to the small signal components in luminance signal being enhanced and recorded on a magnetic recording medium during recording.

A further advantage of the invention resides in satisfying dropout compensation using the output of a 1H delay circuit configuring a comb filter.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 4:
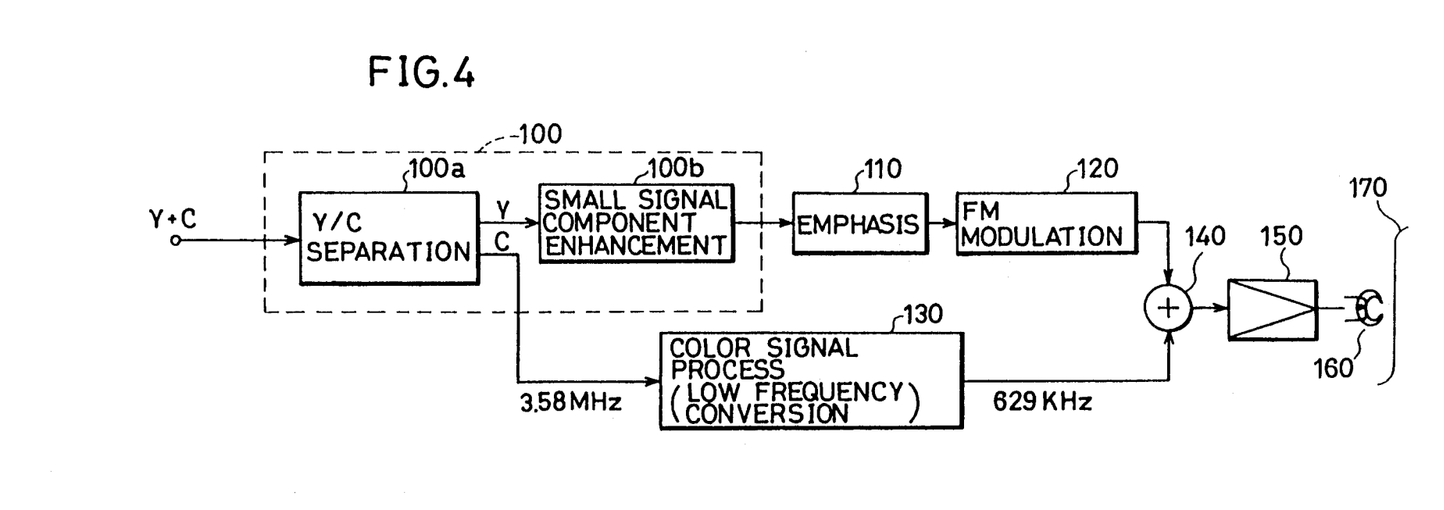
FIG. 4 is a block diagram schematically showing a video signal recording system circuit of a VCR including a Y/C separating circuit in accordance with one embodiment of the invention.

FIG. 4 is a block diagram schematically showing a video signal recording circuit of a VCR including a Y/C separating circuit in accordance with one embodiment of the invention. Referring to FIG. 4, an input video signal (Y+C) provided from a not shown signal source such as a tuner is supplied to a Y/C separating circuit 100. The applied signal is separated into a Y signal and a C signal by a Y/C separating filter 100a comprised of the comb filter previously mentioned in relation to FIGS. 1–3.

The Y signal extracted from filter 100a has the small signal components enhanced by a small signal component enhancement circuit 100b to be applied to an emphasis circuit 110. The enhancement of this small signal components will be explained in detail afterwards. The extracted Y signal is subjected to emphasis process by the emphasis circuit 100 and FM modulated by a FM modulation circuit 120 to be applied to one input of an addition circuit 140.

On the other hand, the C signal extracted by filter 100a is converted to a low frequency region signal of 629 KHz from 3.58 MHz by a color signal process circuit 130 and applied to the other input of addition circuit 140. The Y and C signals mixed in addition circuit 140 are amplified by an amplifier 150 and recorded on a magnetic tape 170 by a magnetic head 160.

Figure 5:
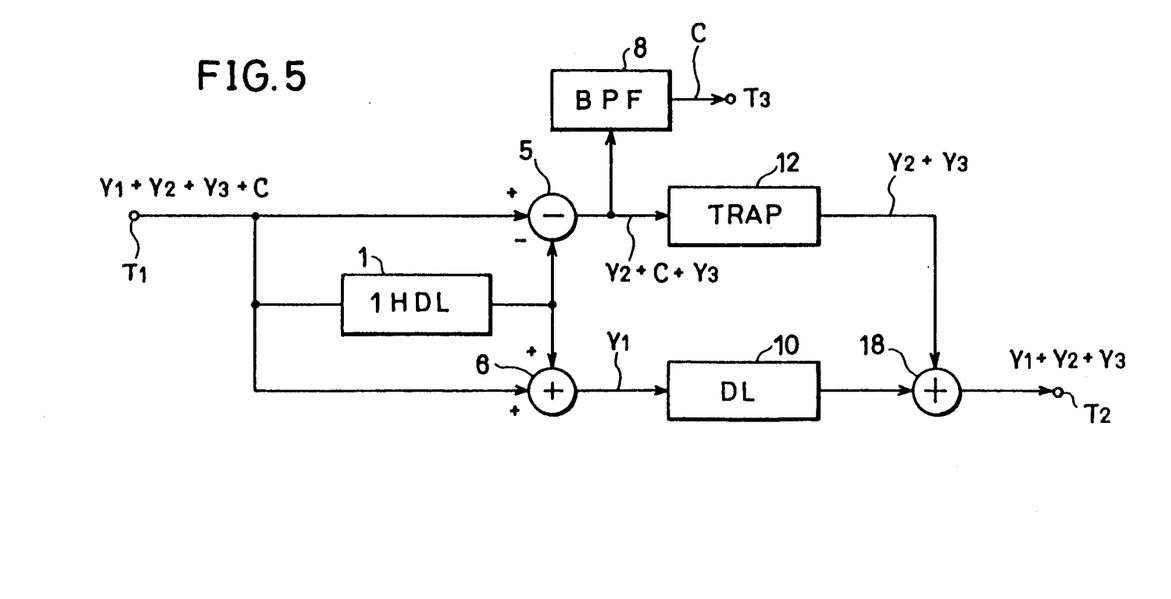
FIG. 5 is a schematic block diagram with reference to the Y signal separation portion in the Y/C separating circuit of FIG. 4.

FIG. 5 is a block diagram for schematically explaining the operation of the Y signal separation portion of the Y/C separating circuit 100 of FIG. 4. To simplify the explanation, the illustration and explanation corresponding to the small signal component enhancement circuit 100b of FIG. 4 is here omitted, and will be explained afterwards.

Referring to FIG. 5, the previously mentioned input video signal (Y+C), or exactly ($Y_1+Y_2+Y_3+C$) including the non-correlation components of Y is provided to the input terminal $T_1$ of Y/C separating circuit 100. The input video signal is directly applied to each one input terminal of a subtraction circuit 5 and an addition circuit 6, as well as to each of the other input terminal of subtraction circuit 5 and addition circuit 6 after being 1 horizontal period delayed by a 1H delay circuit 1.

As previously mentioned, a color signal C and non-correlation components $Y_2$ and $Y_3$ of Y, all having the frequency spectrum of $(n+\frac{1}{2})\, f_H$, are outputted from subtraction circuit 5 to be applied to a band pass filter (BPF) 8. BPF 8 extracts only the color signal component C, and outputs it via terminal $T_3$. On the other hand, a luminance signal $Y_1$ having the frequency spectrum of $nf_H$ is outputted from addition circuit 6. That is to say, this luminance signal does not include the non-correlation components $Y_2$ and $Y_3$ of the low and high frequency regions, which means that degration of the resolution in the vertical direction can not be avoided.

Therefore, the output ($Y_2+C+Y_3$) of subtraction circuit 5 is applied to a trap circuit 12 as well as to BPF 8. The trap circuit 12 traps the C signal to output the non-correlation components $Y_2$ and $Y_3$ of Y and applies them to one input terminal of an addition circuit 18. The output $Y_1$ of addition circuit 6 is delayed the delay time of the above trap circuit 12 by a delay circuit 10, to be applied to the other input terminal of addition circuit 18. As a result, the output $Y_1+Y_2+Y_3$ of addition circuit 18 is provided as a luminance signal via the output terminal $T_2$.

In the above manner of an embodiment of the present invention, the non-correlation components $Y_2+Y_3$ of Y are added to the luminance signal component $Y_1$ of $nf_H$ extracted by the comb filter. Consequently, the luminance signal variation between lines is compensated to prevent the degration of the vertical resolution.

Figure 6:
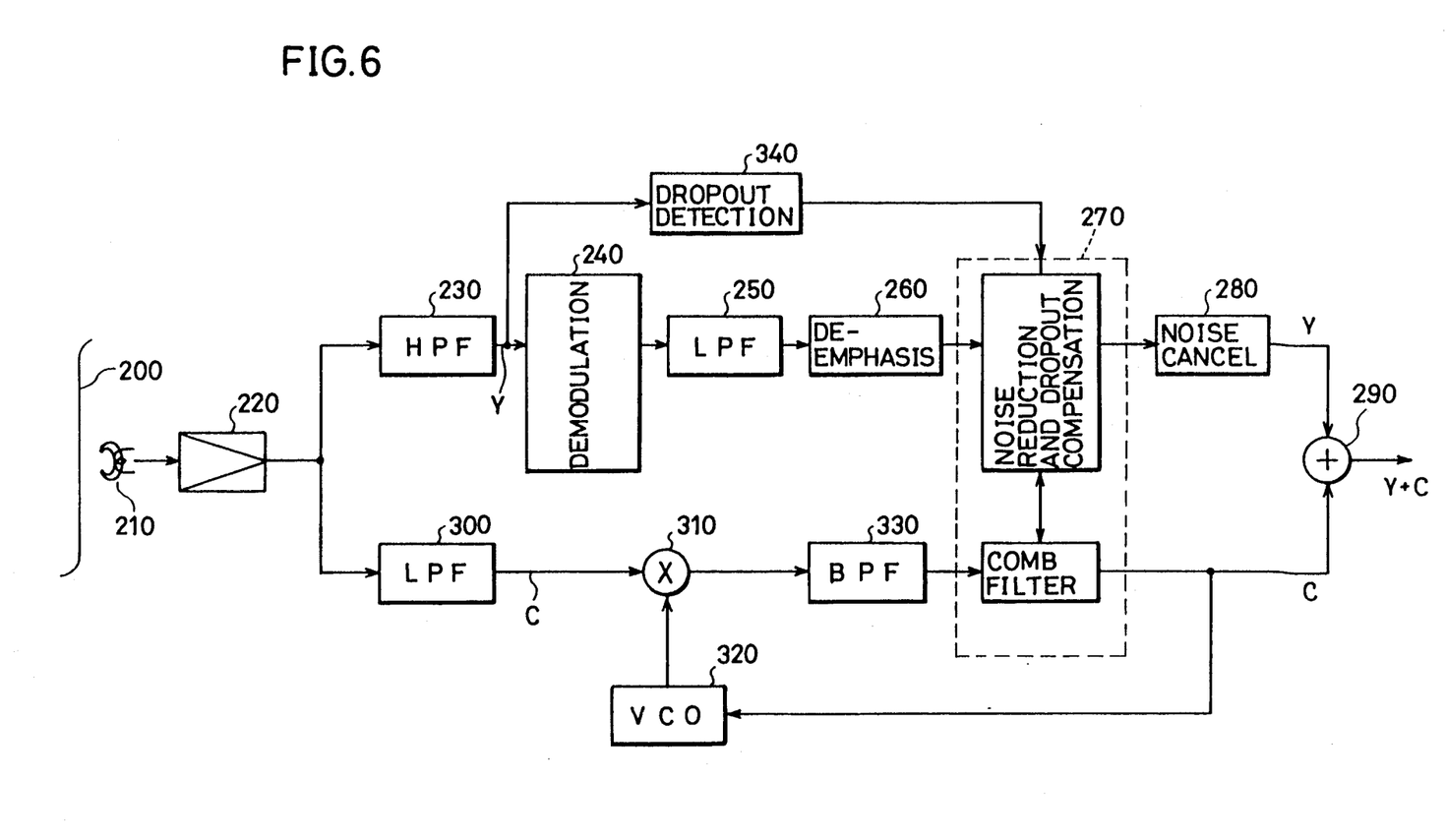
FIG. 6 is a block diagram schematically showing a video signal reproduction circuit of a VCR including a noise reduction circuit in accordance with one embodiment of the invention.

FIG. 6 is a block diagram schematically showing a video signal reproduction system circuit of a VCR including a noise reduction circuit in accordance with one embodiment of the invention. Referring to FIG. 6, the video signal recorded on a magnetic tape 200 is reproduced by a magnetic head 210 and amplified by an amplifier 220. The luminance signal component Y included in the output of the amplifier 220 is extracted by a high pass filter (HPF) 230 to be FM demodulated by an FM demodulation circuit 240. The output of FM demodulation circuit 240 is applied to a de-emphasis circuit 260 via a low pass filter (LPF) 250 to be de-emphasized. The output of the de-emphasis circuit 260 is applied to a noise reduction circuit 270. In noise reduction circuit 270, Y signal has the small noise components suppressed and dropout compensated to be applied to a noise cancel circuit 280. The configuration and operation of noise reduction circuit 270 will be explained in detail afterwards. The noise cancel circuit 280 is provided which functions to reduce or cancel small signal components in high frequency region of the input signal so that the required S/N ratio can be assured. Such noise cancellation can be performed by, for example, extracting the high frequency small signal components of an input through a HPF and a limiter and subtracting the extracted small signal components from the input signal. The Y signal having its noise components removed by noise cancel circuit 280 is applied to one input of an addition circuit 290. The output of the HPF 230 is also applied to a dropout detecting circuit 340 which detects the dropout of the reproduced luminance signal.

On the other hand, the color signal component C included in the output of the amplifier 220 is extracted by a LPF 300 and is converted to a high frequency region signal by a high frequency region converting circuit 310 in accordance with the output of a voltage controlled oscillator (VCO) 320. Then, it is applied to the noise reduction circuit 270 via BPF 330. The signal C having its crosstalk components removed by noise reduction circuit 270 is applied to the other input of addition circuit 290, as well as to VCO 320 to control the oscillation frequency of VCO 320. From addition circuit 290, the reproduced video signal (Y+C) is outputted.

Figure 7:
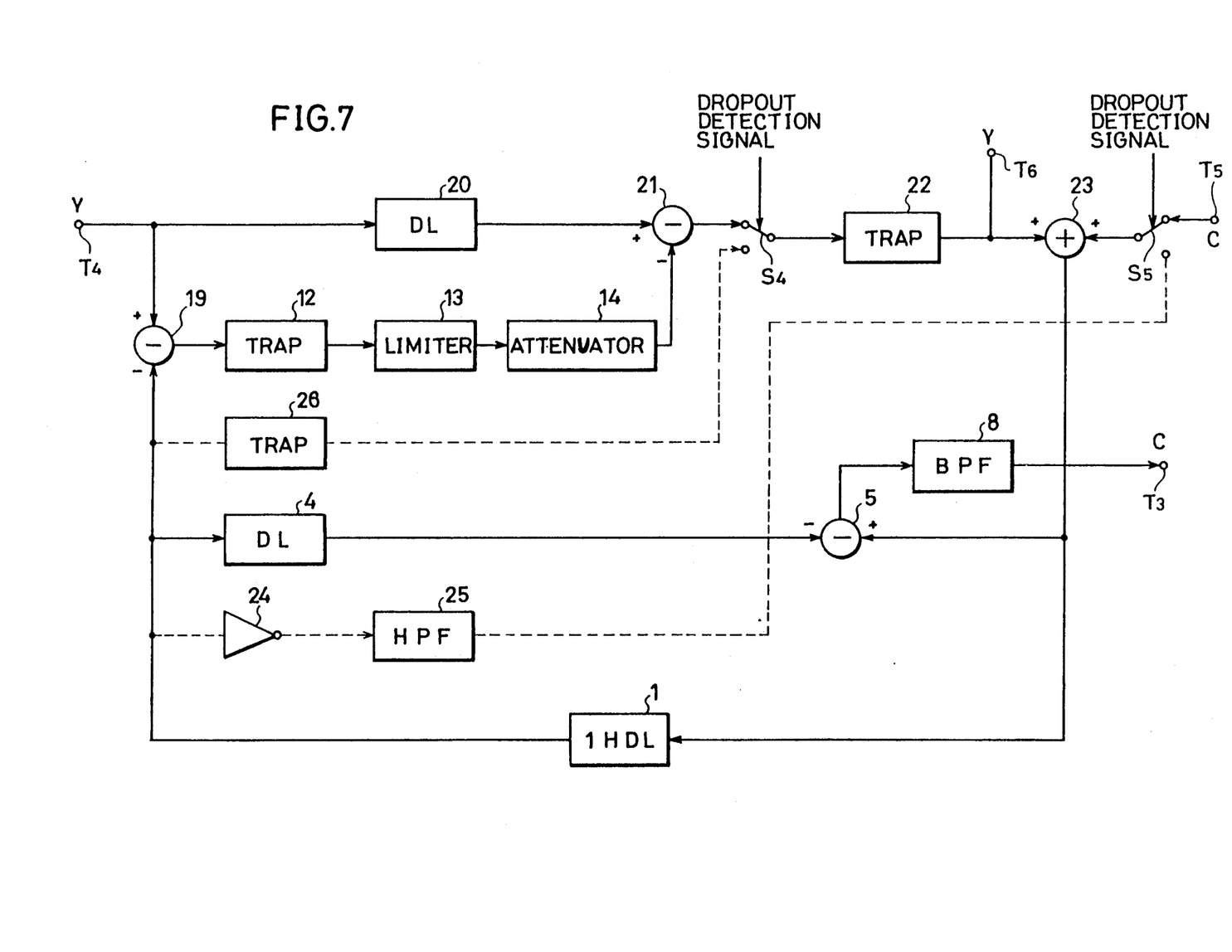
FIG. 7 is a schematic block diagram showing the noise reduction circuit of FIG. 6.

FIG. 7 is a block diagram for explaining the concept of the operation of the noise reduction circuit 270 shown in FIG. 6. Referring to FIG. 7, the reproduced luminance signal Y from the de-emphasis circuit 260 of FIG. 6 is provided via terminal $T_4$ to one input terminal of a subtraction circuit 19. The reproduced color signal C from BPF 330 of FIG. 6 is provided via terminal $T_5$ to one input of an addition circuit 23.

The luminance signal provided to terminal $T_4$ also passes a delay circuit 20, a subtraction circuit 21, a switch $S_4$ and a trap circuit 22 to be applied to the other input of addition circuit 23. Here, the 1H delay circuit 1, delay circuit 4 and subtraction circuit 5 configure a comb filter to extract the color signal component from the output (Y+C) of addition circuit 23. This is provided as a reproduced color signal C via BPF 8 and terminal $T_3$. Meanwhile, subtraction circuit 19 subtracts the output of 1H delay circuit 1 from the inputted reproduced luminance signal to provide the color signal components and the non-correlation signal components to trap circuit 12. Trap circuit 12 removes the color signal band component from the output of subtraction circuit 19 and applies it as the noise component to the other input of subtraction circuit 21 via a limiter 13 and an attenuator circuit 14. In this way, the noise component is removed from the luminance signal component Y applied to terminal $T_4$. The output of subtraction circuit 21 is applied to a trap circuit 22 via switch $S_4$ to have its color signal component removed. Then, it is outputted from terminal $T_6$, as well as being applied to the other input of addition circuit 23 as a luminance signal with the noise components removed. The delay circuit 20 is provided so as to have a delay time equal to the delay time of the non-correlation component detection system comprised of trap circuit 12, limiter 13 and attenuator circuit 14.

When dropout occurs in reproduced signal, switches $S_4$ and $S_5$ are switched to select the signal path indicated by dotted lines in response to a dropout detection signal from the dropout detecting circuit 340 of FIG. 6. Then, a reproduced luminance signal and a reproduced color signal of 1H before are selected and dropout is compensated. That is, a luminance signal of 1H before achieved by the color signal component being trapped from the output of 1H delay circuit 1 in trap circuit 26 is outputted, through switch $S_4$ and trap circuit 22, from terminal $T_6$, as well as being applied to addition circuit 23. Also, a color signal of 1H before extracted by HPF 25 from the output of 1H delay circuit 1 is provided to addition circuit 23 via switch $S_5$. As previously mentioned, the color signal will have the phase of the color subcarrier 180° shifted from the original phase if dropout is compensated simply using the 1H delay signal. Therefore, in the embodiment of FIG. 7, the phase of the output of 1H delay circuit 1 is inverted at inverter 24 and only the color signal component is separated at HPF 25.

In the above manner of one embodiment of the present invention, since the small signal components are enhanced in recording, it will not be suppressed as noise components during reproduction. Also, in the event of dropout, the reproduced luminance signal and reproduced color signal of 1H before outputted from a 1H delay circuit constituting a comb filter are used to perform a satisfying dropout compensation.

In the VCR of the invention, the Y/C separating circuit 100 shown in FIGS. 4 and 5 of recording and the noise reduction circuit 270 shown in FIGS. 6 and 7 of reproduction can be configured to share an identical circuit.

Figure 8:
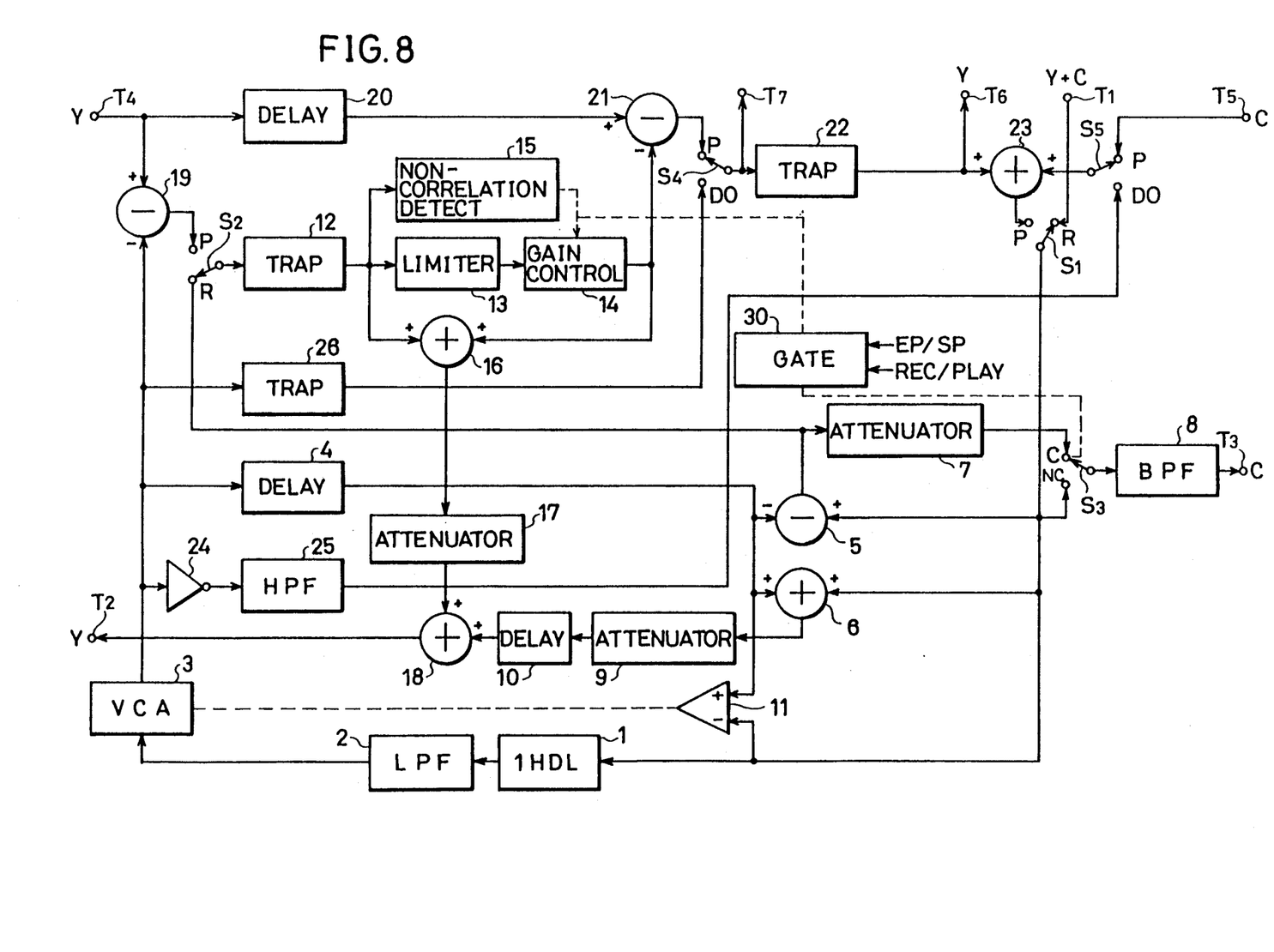
FIG. 8 is a circuit diagram showing an embodiment that can be used as a Y/C separating circuit during recording and a noise reduction circuit during reproduction.
Figure 9:
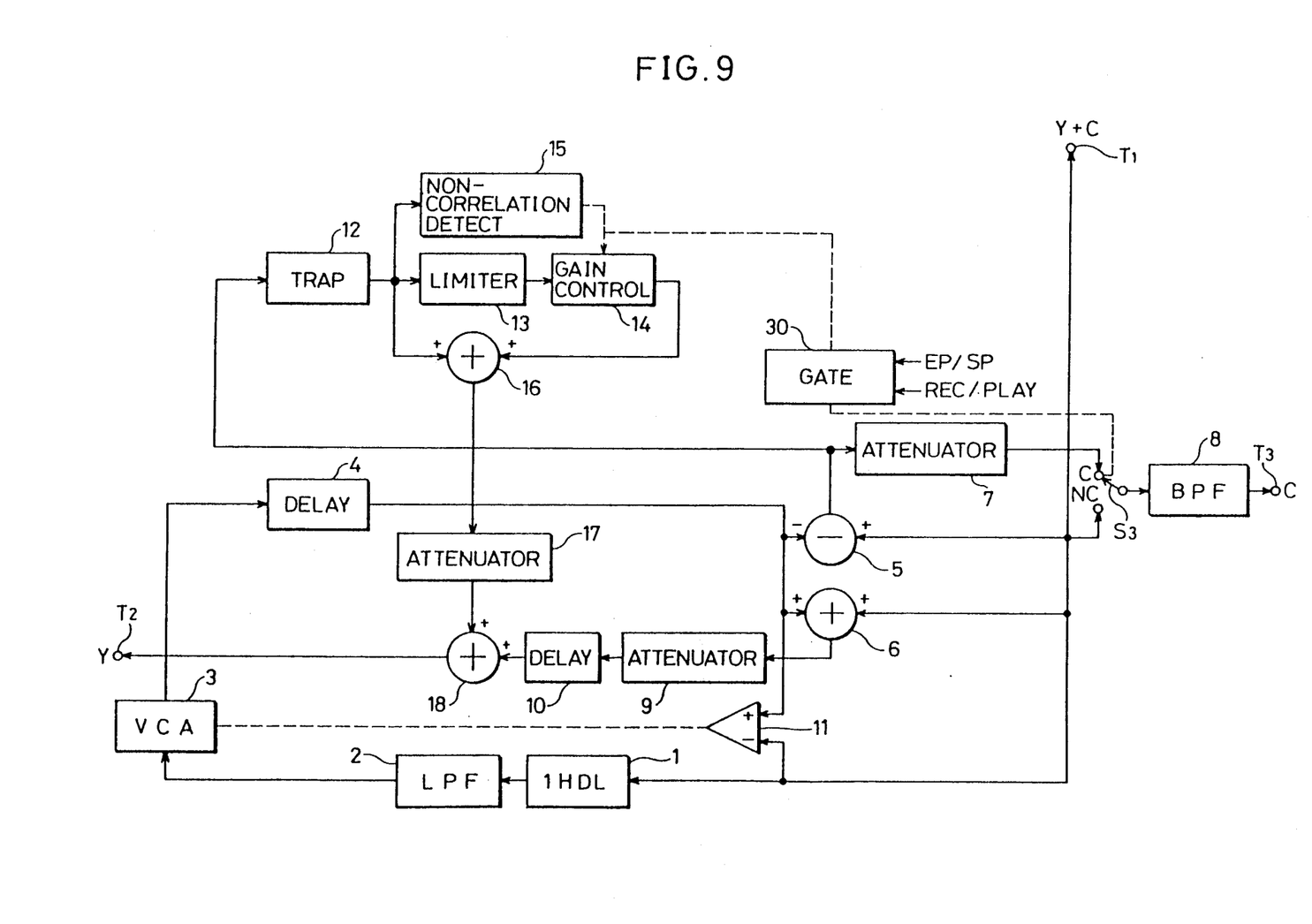
FIG. 9 is a circuit diagram showing a Y/C separating circuit during recording mode.

FIG. 8 shows such a circuit that can be used as a Y/C separating circuit during recording, and as a noise reduction circuit during reproduction. Referring to FIGS. 8 and 9, the operation during recording will first be explained. The same reference numbers as those of FIG. 5 indicate the same elements.

Firstly, an input video signal $(Y_1+Y_2+Y_3+C)$ is provided to the input terminal $T_1$ from a signal source not shown. This is applied to each one input terminal of a subtraction circuit 5 and an addition circuit 6, to the negative input terminal of a comparator circuit 11, and to a 1H delay circuit 1, via switch $S_1$ which is switched to the R side contact during recording. This 1H delay circuit 1 is comprised of one CCD and passes the complete band signal components $(Y_1+Y_2+Y_3+C)$ of the input video signal. The output of 1H delay circuit 1 is applied to each of the other input terminal of subtraction circuit 5 and addition circuit 6, and to the positive input terminal of comparator circuit 11 via LPF 2, VCA 3 and delay circuit 4. The comparator circuit 11 controls the gain of VCA 3 so that the signal level provided to each input terminal of subtraction circuit 5 and addition circuit 6 coincides with the signal level provided to each of the other terminal thereof. The delay circuit 4 is provided for fine-adjusting the delay time so that the signal provided to each one input terminal of subtraction circuit 5 and addition circuit 6 establishes 1H time difference with the signal provided to each of the other terminal thereof. The output of subtraction circuit 5 is applied to attenuator circuit 7 as a signal including the C signal component and the non-correlation components $Y_2$ and $Y_3$ of Y, as explained in relation to FIG. 5, to have the amplitude attenuated. Then, the signal $(Y_2+C+Y_3)$ is applied to a band pass filter (BPF) 8 via switch $S_3$ which is switched to a comb filter (C) side contact. Only the color signal component C is extracted and provided from terminal $T_3$.

Meanwhile, the output $(Y_2+C+Y_3)$ of subtraction 5 is applied to trap circuit 12 via switch $S_2$ that is switched to the R side contact during recording. Trap circuit 12 traps only the C signal component, as explained in relation to FIG. 5, to output the non-correlation components $Y_2+Y_3$ of Y and applies them to one input terminal of addition circuit 16. If the other input of addition circuit 16 is not regarded, the output of trap circuit 12 is applied to one input terminal of addition circuit 18 via attenuator circuit 17. As explained in relation to FIG. 5, the output of addition circuit 6 is applied to the other input terminal of addition circuit 18 via attenuator circuit 9 and delay circuit 10 as a signal including the luminance signal component $Y_1$. Attenuator circuits 17 and 9 will attenuate the amplitude of the input signal to a half.

As a result, the luminance signal $(Y_1+Y_2+Y_3)$ including the non-correlation components of Y is provided via output terminal $T_2$ from addition circuit 18. The delay circuit 10 is provided to have a delay time that is equal to the delay time of the output of subtraction circuit 5 to arrive at addition circuit 18 via trap circuit 12, addition circuit 16 and attenuator circuit 17. This is to avoid time difference between the two input signals of addition circuit 18.

Next, the portion corresponding to small signal component enhancement circuit 100b of FIG. 4 is described. The small signal component enhancement circuit is provided to previously enhance the small signal components of Y signal during recording to present the small signal components in signal Y from being suppressed as noise by the noise reduction circuit during the reproduction mode of the VCR.

In FIG. 5, the non-correlation components $Y_2+Y_3$ of Y from trap circuit 12 has the amplitude limited by a limiter 13 to be applied to an amplification factor modifying circuit 4. The output of trap circuit 12 is also applied to a non-correlation detection circuit 15. During the period where the output of trap circuit 12 exceeds a predetermined level, non-correlation detecting circuit 15 generates a control signal and applies it to a gain control circuit 14. In response to this control signal, gain control circuit 14 is disabled and the provision to the other input of addition circuit 16 is ceased.

Also in response to this control signal, a gate circuit 30 controls switch $S_3$ so as to be switched to a non-comb filter (NC) side contact. Therefore, not the output of the above mentioned comb type filter, i.e., the output of subtraction circuit 5, but the color video signal $(Y+C)$ provided from terminal $T_1$ is applied to BPF 8 via switch $S_3$. More specifically, when non-correlation of Y is detected, it is expected that non-correlation of color signal is also generated. Therefore, in such a case, the color signal component can not satisfactorily be extracted by using a comb filter having a comb type bandpass characteristic as shown in FIG. 2. As a result, when the non-correlation occurs between two adjacent horizontal lines, the supplied color signal is selected as it is, instead of the output of the comb filter, to be outputted as the color signal. The detail of gate circuit 30 will be described later.

On the other hand, during the period where the output of trap circuit 12 does not exceed a predetermined level, non-correlation detection circuit 15 generates a control signal and applies it to gain control circuit 14. Gain control circuit 14 applies the output of limiter 13 to the other input terminal of addition circuit 16 in response to the applied control signal. Thus, the non-correlation signal components $Y_2$ and $Y_3$ from trap circuit 12 are enhanced and added to $Y_1$ signal by addition circuit 18. This means that the small signal components of luminance signal Y outputted from terminal $T_2$ will be previously amplified before recording. Also in response to this control signal, the gate circuit controls switch $S_3$ so as to be switched to the C side contact, and the output of the above mentioned comb filter, i.e., the output of subtraction circuit 5 is applied to BPF 8 via switch $S_3$.

In the above manner, the luminance signal and the color signal separated by the Y/C separating circuit are respectively processed in accordance with the VHS record format by each element 110, 120, 130, 140 and 150 of FIG. 4 to be further recorded on a magnetic tape 170 by a magnetic head 160.

Figure 10:
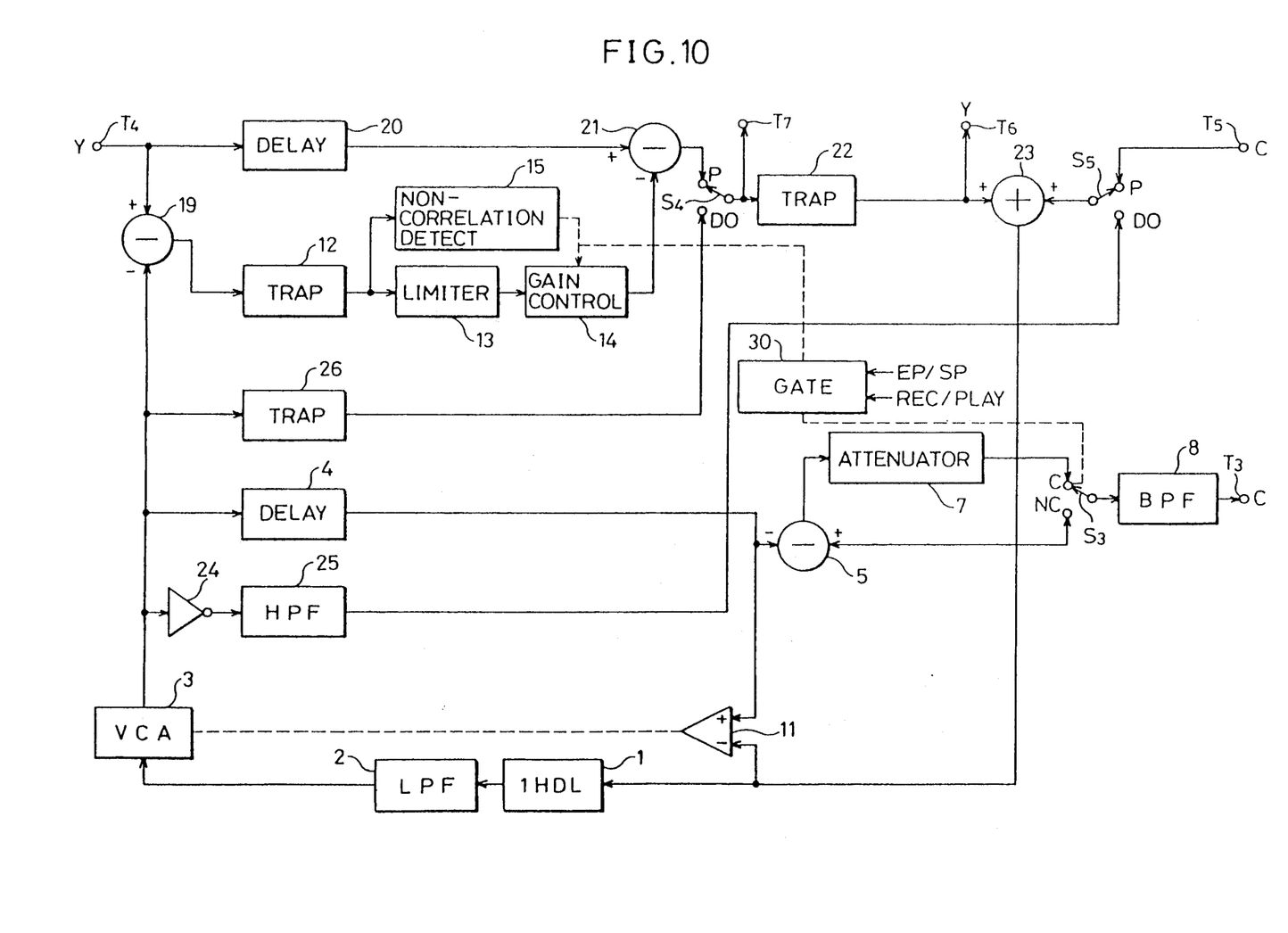
FIG. 10 is a circuit diagram showing a Y/C separating circuit during reproduction mode.

Referring to FIGS. 8 and 10, the operation during reproduction will be described. The same reference numbers indicate the same elements of the reference numbers in FIG. 7. The reproduced luminance signal Y provided to terminal $T_4$ from the de-emphasis circuit 260 of FIG. 6 is applied to the positive input of subtraction circuit 19 for the detection of non-correlation components, as well as to the positive input of subtraction circuit 21 via delay circuit 20 that is provided for timing with the non-correlation processing system.

On the other hand, a 1H delayed reproduced video signal is applied to the negative input of subtraction circuit 19 from 1H delay circuit 1 via LPF 2 and VCA 3. As a result, subtraction circuit 19 generates an output including the non-correlation components of Y and the color signal component and applies them to trap circuit 12 via switch $S_2$ connected to the P side contact during reproduction. In trap circuit 12, the C signal component included in the 1H delayed signal is removed, and only the non-correlation components of Y are applied to the limiter 13 and non-correlation detection circuit 15. The non-correlation components of Y having the amplitude limited by the limiter 13 are applied to gain control circuit 14. This gain control circuit 14 responds to the control signal output of non-correlation detection circuit 15 similar to the operation of the previously mentioned recording to disable gain control circuit 14 during the period where the non-correlation signal level is above a predetermined level, and ceases the noise reduction operation. During this period, the gate circuit 30 controls switch $S_3$ so as to be switched to select the output of addition circuit 23, instead of the output of the comb filter, i.e., the output of subtraction circuit 5. During the period where the non-correlation signal level is below a predetermined level, the gain control circuit 14 is enabled and the output thereof is applied to the negative input of subtraction circuit 21 as the noise components. As a result, a luminance signal component having the noise components removed is provided from subtraction circuit 21. This will be outputted from terminal $T_7$ via switch $S_4$, as well as being applied to trap circuit 22. Trap circuit 22 will remove the color signal component included in the reproduced luminance signal and outputs it from terminal $T_6$ as luminance signal Y.

This luminance signal Y is applied to one input of addition circuit 23, while the reproduced color signal C from BPF 330 of FIG. 6 is provided to the other input of addition circuit 23 via terminal $T_5$. The output of addition circuit 23 is applied to the positive input of subtraction circuit 5 configuring a comb filter, to the negative input of comparator circuit 11, and to 1H delay circuit 1 via switch $S_1$ switched to the P side contact during reproduction. The output of 1H delay circuit 1 is delayed for precisely 1H via LPF 2, VCA 3 and delay circuit 4 to be applied to the negative input of subtraction circuit 5. The color signal from subtraction circuit 5 is attenuated by attenuator circuit 7 to be outputted from terminal $T_3$ via switch $S_3$ and BPF 8 as the color signal C.

Meanwhile, during the SP (standard play) mode, the switch $S_3$ is adapted to be controlled in response to the detection of the non-correlation as described above. However, during the EP (extended play) mode for example, the switch $S_3$ may be switched to select the C side contact irrespective of detection of non-correlation since crosstalk components from the adjacent tracks increase in such EP mode. Therefore, the gate circuit 30 in provided to control switch $S_3$ in response to the control signal from the non-correlation detection circuit 15 and tape traveling speed (EP/$\overline{SP}$) signal and the recording/reproduction (REC/PLAY) signal.

Next, when the occurrence of dropout in reproduced signals is detected at reproduction, the circuit configuration is switched so that dropout compensation will be performed using reproduced luminance signal and reproduced color signal of 1H before as the reproduced luminance signal and reproduced color signal. In other words, regarding the luminance signal component, switch $S_4$ is switched so as to select the 1H delayed signal having the color signal component of the output from VCA 3 trapped at trap circuit 26 at the detection of dropout. Dropout compensation is performed using this reproduced luminance signal of 1H before. Regarding the color signal component, after the phase of the color subcarrier is inverted by inverter 24, only the color signal component is extracted by HPF 25 to be applied to one input of addition circuit 23 through switch $S_5$, as explained in relation to FIG. 7. As a result, the phase inversion of the color subcarrier will not occur even at dropout compensation, leading to a satisfying dropout compensation.

If the delay time of HPF 25 is half the period of the color subcarrier, inverter 24 is not necessary. A delay circuit for timing may be provided at the prior stage or post stage of trap circuit 26.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A luminance signal/color signal separating circuit comprising:
    means ($T_1$) for providing a color video signal including a luminance signal and a color signal,
    1H delay means (1) for delaying said color video signal by 1 horizontal period,
    first addition means (6) for adding said color video signal and the output of said 1H delay means,
    subtraction means (5) for subtracting said color video signal and the output of said 1H delay means,
    means (7, 8, $T_3$) for outputting the output of said subtraction means as said color signal,
    signal separating means (12) for removing said color signal from the output of said subtraction means,
    second addition means (18) for adding the output of said signal separating means to the output of said first addition means to output the result of addition as said luminance signal,
    means (15) for detecting whether the output of said signal separating means includes non-correlation components of said luminance signal which are above a predetermined level or not, and
    means (13, 14, 16) for enhancing said non-correlation components when said detection means detects that the output of said signal separating means does not include non-correlation components which are above said predetermined level.

2. The luminance signal/color signal separating circuit according to claim 1, wherein said non-correlation component enhancement means comprises
    amplitude limiting means (13) for limiting the amplitude of the output of said signal separating means,
    third addition means (16) for adding the output of said signal separating means output and the output of said amplitude limiting means,
    means (14) provided between said amplitude limiting means and said third addition means for inhibiting the provision of the output of said amplitude limiting means to said third addition means when said detection means detects that the output of said signal separating means includes non-correlation components which are above said predetermined level.

3. The luminance signal/color signal separating circuit according to claim 1, further comprising first delay means (4) for establishing the time difference between said color video signal inputted to said first addition means and subtraction means and the output of said 1H delay means to be precisely 1 horizontal period.

4. The luminance signal/color signal separating circuit according to claim 1, further comprising means (11, 3) for making the level of said color video signal inputted to said first addition means and subtraction means coincide with the output level of said 1H delay means.

5. The luminance signal/color signal separating circuit according to claim 1, further comprising second delay means (10) connected between said first addition means and said second addition means for delaying said first addition means output by the delay time of said signal separating means and said non-correlation component enhancement means.

6. A noise reduction circuit comprising:
   means ($T_4$, $T_5$) for providing a reproduced luminance signal and a reproduced color signal separately,
   addition means (23) for adding said provided reproduced luminance signal and reproduced color signal,
   1H delay means (1) for delaying the output of said addition means by 1 horizontal period,
   first subtraction means (5) for subtracting the output of said addition means and the output of said 1H delay means,
   means (8, $T_3$) for outputting the output of said first subtraction means as said reproduced color signal,
   dropout compensation signal generating means (24, 25) for separating said color signal from the output of said 1H delay means and inverting the color subcarrier phase thereof to output as a first dropout compensation signal, and
   means (370, $S_5$) for providing said first dropout compensation signal instead of said reproduced color signal to said addition means at the occurrence of the dropout.

7. The noise reduction circuit according to claim 6, further comprising
   second subtraction means (19) for subtracting said reproduced luminance signal and the output of said 1H delay means,
   signal separating means (12, 13, 14) for removing said color signal component from the output of said second subtraction means to output the result of subtraction as noise component, and
   third subtraction means (21) for removing said noise component from said reproduced luminance signal.

8. The noise reduction circuit according to claim 7, further comprising means (26, $S_4$) for providing a second dropout compensation signal generated by removing said color signal from the output of said 1H delay means, instead of said reproduced luminance signal, to said addition means of the occurrence of the dropout.

9. The noise reduction circuit according to claim 6, further comprising first delay means (4) for establishing the time difference between the output of said addition means inputted to said first subtraction means and the output of said 1H delay means to be precisely 1 horizontal period.

10. The noise reduction circuit according to claim 6, further comprising means (11, 3) for making the level of the output of said addition means inputted to said first subtraction means coincide with the output level of said 1H delay means.

* * * * *